UNITED STATES PATENT OFFICE.

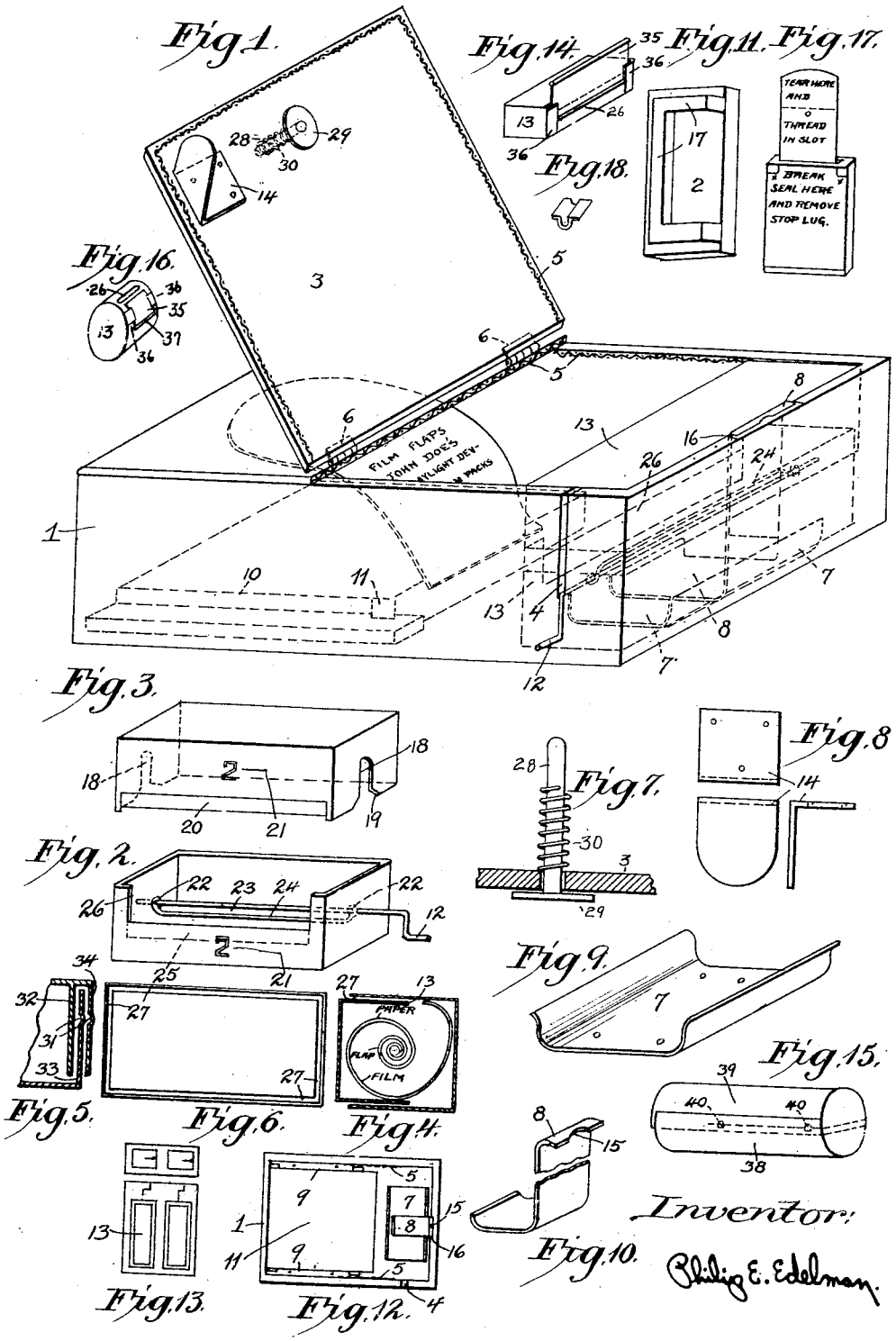
P. E. EDELMAN.
MEANS AND METHOD FOR DEVELOPING PHOTOGRAPHIC FILMS.
APPLICATION FILED SEPT. 13, 1915.
1,304,032.
Patented May 20, 1919.
Inventor:
Philip E. Edelman.

PHILIP E. EDELMAN, OF ST. PAUL, MINNESOTA.

MEANS AND METHOD FOR DEVELOPING PHOTOGRAPHIC FILMS.

1,304,032. Specification of Letters Patent. Patented May 20, 1919.

Application filed September 13 1915. Serial No. 50,455.

*To all whom it may concern:*

Be it known that I, PHILIP E. EDELMAN, a citizen of the United States, residing at 1802 Hague Ave., St. Paul, in the county of Ramsey and State of Minnesota, have invented certain new and useful Means and Method for Developing Photographic Films, of which the following is a specification.

My invention relates to the development of photographic films in daylight or without the necessity of using a darkroom and more particularly to the development of individual films or negatives known in the art as pack films.

Heretofore as far as I am aware there has not been any means or method for developing film packs all by daylight and I believe that I am the first to solve the problem, namely, the development of perfect negatives from film pack films in full daylight or without any manipulations necessary in a darkroom. In my application for Letters Patent filed Aug. 12, 1914, series of 1900, No. 856,353, I have disclosed means and method for making and using a daylight developable film pack. The object of the present invention is to afford a simple inexpensive efficient method and means for manipulating such improved film packs to the end that perfect negatives may be developed by a mere beginner in full daylight and without requiring that said amateur should in any way touch the sensitive film until it is developed. A further object is to insure the even development of the entire film while it is at all times protected from contact with the film flap paper end and from injurious light rays. The present invention obviates the need for placing a support on a portion of the sensitive film surface to space it and instead utilizes the properties of the film itself including the elasticity or springiness thereof to afford the essential full exposure to the treating fluid. Further objects will presently appear.

My invention consists in saving all or a portion of the flap of the film after it has been exposed in a camera, drawing a film from its containing pack thereby while the remaining flaps are held out of the way and while the pack is held so that the film being drawn is protected from light the drawing being done by winding up the flap end into a container capable of admitting fluids and excluding light, the film being thereby curled about its inner sensitive surface so that this surface is entirely exposed within said container, and thereafter supplying a reagent fluid to the film thus wound into a protected position.

I have made many arrangements and embodiments in accordance with this invention and do not wish to be understood as limiting myself in any way to the detailed embodiment hereafter described as this is merely by way of example of a practical mode of carrying out my general invention and various changes and modifications may be made by those familiar with the art, within the scope of the appended claims.

Figure 1 is an assembled isometric view of a suitable embodiment of my invention; Fig. 2 is an isometric view of the bottom portion of the individual film container used therewith; Fig. 3 is an isometric view of the top cover of this container; Fig. 4 is a diagram showing the position of the film in the individual box holder at the stage shown; Fig. 5 is a fragmentary section of a modified construction for the box of Figs. 2 and 3; Fig. 6 is a diagram showing the relative positions of the parts of Figs. 2 and 3 whereby a fluid passage is obtained while light is excluded from the interior of the box thus formed; Fig. 7 is a fragmentary section of the hinged portion of the cover of Fig. 1 showing the relation of the spring push thereto; Fig. 8 is a front elevation, plan and side view of the slot closing member carried at the side of the hinged cover of Fig. 1 with the relative position of the slot covered indicated by dotted lines in the front elevation thereof; Fig. 9 is an isometric view of the individual-box holder attached to the bottom of the device of Fig. 1; Fig. 10 is an isometric view showing the device for removing the individual-box holder used as shown in Fig. 1; Fig. 11 is a perspective view of the bottom side of the rear portion of the cover shown in Fig. 1; Fig. 12 is a smaller plan view of the device of Fig. 1 with the top cover entirely removed and with the individual-box also removed; Fig. 13 is a diagrammatic representation of the front and top of a suitable solution cup for use with the individual-box holders; Figs. 14, 15, and 16 are modified forms of the individual box holder; Fig. 17 is a view of the daylight developable film pack showing how only a portion of the flap need be saved, and Fig. 18 is an isometric view of one of the stop lugs used with this film pack.

Reference is made to my copending application hereinbefore mentioned. Whereas in the prior art it is necessary to break open the bottom of the film pack generally in use and remove the films in a darkroom by hand thus necessarily touching the sensitive surface of the film with the fingers and possibly spoiling the lower end of the film I provide a pack (see Fig. 17) in which all the normal advantageous functions of the film packs are retained but in addition I provide stop lugs which normally retain but just before development allow the films or such films as are wanted to be pulled out by the flap thereof for daylight development.

This pack may be made in the usual manner except that the stop for the films is made removable and resealable if wanted. It is not necessary to break open the back of the pack as the films can then be pulled out from the top. The usual strip of velvet which forms a light valve is preferably attached to the film pack instead of the metal retainer usually used therein and removable pieces of sheet metal shaped as in Fig. 18 or the equivalent thereof are pasted on top with gummed paper to form a mechanical seal which normally prevents a beginner from pulling the film out of the pack beyond the light-tight valve of velvet. The lugs can then be replaced if desired and resealed after the desired films have been developed. Also it should be noted that the films can be developed in the order in which they have been exposed. The projecting loop of the lug, Fig. 18, in practice extends down into the velvet valve and stops the film because the film is wider than the flap which the lug, two lugs being used of course, one at each end of pack, allows to pass. The device presently to be described permits the entire flap to be retained and used or else a portion thereof may be torn off as directed by printing on the flap or by means of perforations or holes in said flap as indicated in Fig. 17.

The box of the machine 1 has a hinged cover 2, 3, with suitable means for making the whole light tight, here for example principally in the form of strips of velvet black fabric suitably fastened along the rims where necessary as shown by 5. The box 1 also has a slot 4 through which the crank 12 of the individual-boxes 13 may be placed. A projecting flange 14 carried suitably by the cover 3 which is hinged to 2 at 6, 6, slides between 13 and 1 when 3 is placed down on 1 and covers 4 as shown by Fig. 8. 1 may be of wood or metal or any suitable materials and 14 is preferably stamped out from sheet metal. The cover 2, 3 itself becomes light tight when 3 is down because of the velvet strip 5 at the hinged joint 6—6. Instead of velvet any suitable means may be used. Any suitable holder for a film pack may be embodied in or attached to 1 and here for example a suitable recess is simply formed in the bottom of 1 so that the pack 10 can slide into the recess 11 formed between suitable strips 9 at the bottom side edges of 1. It is merely necessary to press the pack 10 gently into place where the recess 11 or strips 9 retain it by friction so that it can be easily removed again if desired. The holder 11 is of course arranged so that the pack 10 is in proper alinement with the box 1 and individual-box 13.

At the slotted end 4 of the box 1 any suitable means for supporting guiding or manipulating the individual-film-holder 13 may be used and here for example a permanent holder 7 formed of springy sheet metal as in Fig. 9 is simply suitably attached to the bottom of 1. A removable holder for 13 then slips into place inside of 7 as shown by 8, which removable holder is also formed of sheet metal as shown in Fig. 10. The lower portion of 13 thus fits into the double holder 7, 8 and the upper lug 15 of 8, suitably formed to accommodate the finger tip of a human hand as shown, fits into a recess 16 in the box 1 so that this lug 15 normally lies flat with the top rim of 1 but can be easily reached and manipulated with a human finger.

The portion 2 of the cover 2, 3, has a rim 17 on its bottom surface as shown in Fig. 11 which rim registers with the top of box 1 so that this cover is always in proper alinement and also of course the rim 17 tends to exclude light rays because the latter cannot follow around the zig-zag course thus offered. The whole interior of 1, 2, 3 may be coated with dull black paint if desired. It is to be noted too that when the cover portion 2 is inserted into place over 1 containing pack 10, 2 hits and retains the film flaps of 10 out of the way as shown. Of course, if wanted a separate holder for the flaps can be used or an extension of the cover 2 may be supplied for such purpose but I have found by experiment that this is unnecessary as the flaps take care of themselves as shown.

The individual box 13, of which of course any desired number may be provided, may be of any suitable form and I do not wish to limit myself to the specific embodiment shown because I have constructed other modifications in accordance with this invention and know that different forms embodying this same principle can be used though they are not as simple and cheap. I have for example found it feasible though not desirable from the standpoint of expense to make up a group of containers similar to the box 13 all mounted on a common support to successively take up all the films of the pack and believe it to be unnecessary to describe such obvious equivalents. As shown by way of example in Fig. 1 the idea is to wind up and treat each film of the pack individually in a container 13. As shown this container 13 is constructed of two parts as shown in Figs. 2 and 3.

The bottom half, Fig. 2, is preferably formed of sheet metal as shown and if solder is used the joints are of course tight or if the metal itself is thus formed the same result is secured. The piece 25 of the sheet from which this bottom half is formed is simply folded back to form a smooth edge over which the film may be pulled and an open slot 26 is thereby formed. The crank 12 of rod or wire extends through the sides of this bottom of the box as shown to form a shaft journaled therein and may be itself slotted to form a slot 23 through which the film flap may be threaded or preferably, as shown, for cheapness it may be desirable to simply twist another piece of wire or rod 24 about 12 at 22 to form the same slot 23. In any case it is to be noted that the shaft 12 about covers up the holes necessary in the bottom half of Fig. 2 which are further sealed against light by the enlarged portion inside at 22, 22 which portions also restrict and retain the shaft 12 properly. Now I have used separate reels and other arrangements for this same purpose and do not wish to limit myself to this precise form though it is preferred because it is cheap and practical as well.

The top cover shown in Fig. 3 is similarly formed from metal and both may of course be suitably painted, enameled, or plated if desired though common tin sheet will do nicely. The sides of this top cover have a slot 18 and beveled edge 19 to fit over 12. A slight flap 20 of the metal is bent over as shown to afford a smooth passageway for the film. Both top and bottom may be suitably identified by numbers as shown by 21 to insure that the box is put together properly and to identify the various exposures and films in development. The cover of Fig. 3 is slightly larger than the bottom portion of Fig. 2 so that a fluid channel is formed when the cover is in place over the bottom portion as indicated by 27 of the diagram of Fig. 6. Light however cannot travel the zig-zagged course offered to the fluid and cannot injure the film when contained inside, as I have found by experiment.

In use, having placed the film pack, cover 2, 3, and holder 8 in position as shown in Fig. 1 the lower portion of 13 illustrated in Fig. 2 is placed in the bottom of 1 within the holders 7, 8, so that the crank 12 extends through 4 as shown. Then the operator takes the first flap of the first film to be developed and threads it through 26 and into slot 23 carried by 12. The cover shown in Fig. 3 is then inserted over this until the top thereof is flush with the top of box 1 as shown in Fig. 1. It does no harm if this top cover of 13 then falls of its own weight as the slot 26 is thereby merely narrowed but the film can still pass, as I have found by experiment. The pack has of course been prepared for development as already set forth. The hinged portion of the cover, 3, is now put down and firmly held with one hand thus closing the whole and protecting it from light as will be obvious from the foregoing description. The crank 12 is now turned with the other hand a few times until a few recurrent clicks are heard by the operator as the film when wound up within 13 springs against the inside of 13 and gives an audible signal that it is all wound up properly. The operator then merely pushes down on the push 28 carried by cover 3 thus pushing down and closing the box 13 tightly. The spring 28 (Fig. 7) then restores the push 28 with its flange 29 back into the original position. The cover 3 is then lifted up, the box 13 is grasped with the thumb of one hand the forefinger of which is slipped into lug 15 and the whole box 13 now closed is lifted out of 1 and placed into a suitable solution cup with suitable developing solution such for example as diagrammed in Fig. 13. The holder 8 is replaced and the operation may be repeated for as many films as desired.

The holder 8 and spring push 28 are not essential to the action but are very convenient in facilitating the manipulation and any suitable means for the same purpose may be employed. When the cover 3 is lifted up the manipulation can be carried out as specified without damage to the films contained in pack 10 as it is only necessary to close 3 down when a film is passing from 10 into 13. When the top of 13 is closed down slot 26 is of course closed as will be obvious and the whole individual box 13 is closed against light though fluids freely pass. The film thereby is wound up something after the fashion diagrammed in Fig. 4. The paper flap winds up on shaft 12 out of the way and the film is curled up facing inwardly, as I know from experiment, so that nothing touches it. At first the backing paper of the film is wound at the back of the film where it does no harm as shown and if during development the crank is occasionally turned clockwise a few turns as I have found to be desirable this paper tends to come loose from the film and wind up on 12 thus stirring up the fluid over the film and leaving the latter entirely free so that every fraction of a needlepoint's surface of the film is freely exposed to the fluid. In practice I find that the backing paper itself at first tends to cover slot 26 in addition to the closure formed by the top cover of the individual container 13. After the film has been in the solution for a few minutes the adhesive which normally holds it to the paper becomes loose so that turning the crank then causes the result stated hereinbefore. After winding the film up in the box the crank may be used as a handle for manipulating the whole within a suitable solution cup as shown in Fig. 13. I prefer to make the solution cup of suitable size such for example as to accommodate one, two, or a few films as this makes for economy of reagents if only a few films are to be developed at a time and duplicate solution cups and boxes 13 can be supplied if additional ones are wanted. Of course any suitable solution container may be used and it may be made to telescope or fit within box 1 or without it if wanted. For instance two telescoping solution containers will readily fit within the box 1 so that the whole outfit can be made self contained.

The box 13 may of course be made in various sizes or of adjustable size and in any case it is to be noted that a given size will accommodate also all sizes which are smaller. Thus one box may be used to develop films of one size and all sizes which are smaller or may be made so that any size of film made can be treated in the same box if desired. It is desirable to insert the boxes 13 in the solution endwise as the air within can then escape best. It is to be noted too that any number of films, even from more than one pack, can be handled successively in this manner without loss of time as while one box 13 is in the solution developing the next can be wound up, etc., and the same may be said later when the films are washed and fixed for if prepared consecutively the films will be successively ready for final manipulation and no time is lost. Immediately after immersing the box 13 and at intervals of a few minutes during development it is desirable to pump the box up and down a few times by means of handle 12 or to turn this crank 12 or both as the developer is thus caused to positively act evenly. With my present invention the machine I provide performs the full equivalent of the old darkroom method now in general use and does it quicker, better, and without requiring the darkroom or touching the film with the fingers. The time of immersion of each numbered box 13 may be noted on a slip of paper and the usual time and temperature method is to be followed out in all other respects. After the proper time has elapsed the developer is to be washed out from the box 13, though it does not need to be thrown away but may be saved and used again, and the box 13 after three washings with water in the usual manner can be opened and the developed film taken out in daylight and immediately be placed in a fixing solution. Or instead of this the box 13 can be left closed and immersed in a solution cup containing a fixing solution. Perfect negatives invariably result because no hands touch the film before development and nothing prevents the full action of the reagent during development. The boxes 13 are easily kept clean and dry. A further advantage results from the fact that the film flaps which have been saved according to my invention can carry remarks by the operator which are thereby saved until the very last and may aid the operator in specially treating a film known to be peculiar because of the manner of exposure.

I believe any similar means and method to be full equivalents within the scope of my claims including forms with other shapes for the boxes 13, grouped containers similar to 13, containers 13 with separate appliances, etc., and desire to protect my invention fully as set forth in the appended claims.

Merely by way of example of a few of the changes which are possible within the spirit of this invention and the appended claims I have shown a few of the modifications.

Thus in Fig. 5 I show a modified form of constructing the box 13 whereby one half has an inside and outside flange 32, 34 respectively into which a flange 33 of the other half may fit and be retained by reason of a button 31 pressed into 34 and 33. A better though probably unnecessary light tight joint is thereby afforded though fluids may pass as before and in addition the button 31 may be formed so that it acts as the stop which just allows the top of box 13 of Fig. 1 to come flush with the top of 1 as specified and thereafter pushed into the position indicated in Fig. 5.

Fig. 14 shows how a slide 35 moved down between guides 36 on box 13 may be used to close a slot 26, the other features being understood to be similar to those specified.

Fig. 16 shows this slide 35 adapted to a round form of box 13 having slit 26 and guides 36 as before. A lug on 35 enables slot 26 to be closed by 35 if 13 is simply turned while 37 hits against a stop, and of course the rest would be the same as already set forth though different in detail. Fig. 15 is merely by way of suggesting that a square form of box is not essential and I have here shown how a round or other shape of box can be constructed with hinges 40 so that the top portion 39 can be pressed over to close down on 38 thus closing a naturally formed slot offered before the closing, as before. The crank 12 can of course be used with any such form in the same manner as already set forth. So too, the box 1 may obviously be incorporated with or as a part of the usual cameras or film pack adapters used for film packs so that the film can be transferred directly from the pack to the box 13 in the manner set forth.

I have now described and shown my invention fully and have shown and specified an embodiment thereof which I know from experiment and trials to be practical. Many changes and modifications may be made within the scope of the appended claims.

I claim, and these Letters Patent are to be understood as granted for:

1. Means for treating a film of a film pack which comprise a container adapted to receive a film pack, a winding shaft in relation therewith and having means to engage the paper extension belonging to said film, and an auxiliary container included by said first container and in turn including said winding shaft.

2. In apparatus of the character set forth, a box, means therein to receive and retain a film pack and the paper extensions belonging to the individual films thereof, an individual film container adapted to fit within said box, a shaft in said container having means to engage one of said paper extensions, and a crank for said shaft extending through said container and box.

3. In apparatus of the class specified, a box, a film pack holder therein, a film holding container adapted to fit within said box, a winding shaft in said container and extending through said box and container, means carried by said shaft to engage a paper extension belonging to a film from said film pack, and means to manipulate said film holding container.

4. The method which consists in inclosing a film pack within a light tight container, pulling a film from said pack by means of its attached flap into a fluid admitting holder within said container and simultaneously disposing of said flap within said holder so that it cannot contact with said film, closing said holder to light and removing it from said container, and applying a developing fluid to said film within said holder.

5. In apparatus of the class specified, a light tight box having a cover fluid admitting compartments therein, means for supporting a film pack and its flaps therein, and means for winding individual films therefrom into a curled position within said fluid admitting compartments.

6. In apparatus of the kind specified, a box, a cover which renders said box light tight or light admitting according to the needs of the operator, and means for curling up a film from a magazine of films into a fluid exposed light excluding substantially U-shaped position within said box.

7. In apparatus of the class described, means for winding the paper extension of a flat film tightly about an axis and for curling said film into a substantially U shape about but not supported by said axis.

8. In apparatus of the class specified, a stationary compartment for a film and means for curling a flat film therein entirely without a darkroom.

9. Means for the purposes set forth comprising a light tight container, a compartment which will admit a fluid but exclude undesired light, a closable entrance thereto and means for drawing a flat film into a partially curled position within said compartment while said compartment is itself held in said light tight container.

10. In apparatus of the class specified, a film non-flexible compartment and means for partially curling up a substantially flat film therein without touching said film.

11. In apparatus of the class specified, a film holder open to fluids and closed to light, means therein for curling up a film therein while said holder is maintained stationary, means for protecting said film from light during said curling, and means for subsequently treating said film while it is in said holder.

12. In a device of the character described, a film supply holder, an individual film holder in relation thereto, means in said individual film holder to engage a paper extension of a film in said supply holder and for transferring said film to said individual film holder thereby, and a box including said holders and provided with means to exclude light therefrom and to manipulate said individual film holder.

13. In a device of the class set forth, a winding shaft provided with means to engage a paper strip belonging to the film to be treated, a film holder in relation to said shaft and provided with a closable slot, a box to contain said film holder and provided with means to hold a supply of films to be treated, and means to manipulate said film holder and shaft from without said box.

14. In apparatus of the character specified, a box, a cover therefor, means in said box to hold a film pack and an individual film holder, means comprised by said individual film holder to engage a paper strip belonging to a film of said film pack, means to exclude light from said film holder, and means fitted to said box to facilitate the manipulation of said film holder.

15. In apparatus of the character specified, a film pack holder, a winding shaft in relation therewith, means on said shaft to engage a paper strip belonging to a film of said film pack, a film holder in relation to said shaft, means to protect said film from light as it is transferred from said film pack to said film holder by means of said shaft, and means to manipulate said film holder to render it light tight after said film has been transferred to it.

16. In a device of the character set forth, a film holder comprising a two part casing including a winding shaft adapted to engage a strip of paper, and means in said casing to provide a closable slot wherethrough said strip may be moved.

17. In apparatus for the daylight treatment of film pack flat films, a light tight box, a non-rotary container provided with means for admitting a film thereto, means for drawing a film into said container while both are inclosed in said light tight box into which said compartment fits, and means for closing said container to light after drawing a film therein whereby the container may be removed from said box and transferred into a developing bath.

18. Means for treatment of a film pack film comprising a small light tight container adapted to receive a film pack, a film holder adapted to removably fit therein, and a winding shaft journaled in said film holder.

19. In apparatus of the character set forth, a container provided with a slot and including a shaft and means to engage a paper strip belonging to the film to be treated, a film pack holder in relation thereto, means to exclude light from said container and holder, and means to manipulate said container to render it independently light tight.

20. In apparatus of the class described, a photographic film compartment adapted to hold a flat film partially curled and identified and including a winding shaft associated with said compartment means for transferring said film thereto in daylight.

21. Apparatus for developing film pack films having in combination, a container adapted to receive a film pack, and a plurality of interchangeable film holders adapted to fit within said container and comprising means for pulling and loosely coiling films from said pack within said holders successively.

22. Apparatus for daylight development of film pack films comprising a light tight box, a pack support in its bottom, a cover adapted to coöperate therewith to retain the film flaps of said pack out of the way until wanted, an individual film compartment and means associated with said box and forming a part thereof for manipulating said compartment.

23. A film compartment with a substantially centrally supported shaft provided with means for engaging a film extension, a closable film entrance therefor, and means actuated by the hands of an operator who is in the presence of light normal to the operator's location for transferring to and holding a film-pack film in said compartment.

24. In apparatus of the class specified, a film compartment, and means which cause a film being treated to indicate by an audible signal originated by the motion of said film that it is ready for further treatment.

25. In combination, a box, means therein for receiving a film holder carrying a shaft, means to facilitate removing said holder, and means for manipulating said holder and shaft from without said box.

26. Apparatus used in film developing comprising a container, means therein for supporting a film pack, a closable film holder adapted to fit in said container, a shaft comprised by said compartment, and means comprised by said container for closing said compartment.

27. In film pack treating apparatus, a box, a cover therefor provided with means for shutting out light from said box, a film pack holder in said box, a plurality of interchangeable film holders in relation to said holder, and means for successively transferring individual films from said holder into a coiled position within said holders.

28. In apparatus of the class specified, a box having means for holding a film pack and its flaps and for receiving a plurality of film compartments, one for each film to be developed, and a shaft extending through said box and having means for directly engaging one of said flaps and winding said flap about said shaft.

29. Film pack developing apparatus comprising a light tight box, a film pack holder and a film holder therein, and a winding shaft journaled in said compartment and rotatable from without said box, said shaft being used to wind the attached paper of a film pack film to draw said film in a loop about said shaft within said container.

30. In apparatus of the class set forth, a film pack support and means for drawing a film therefrom and into a partially curled position within a light tight fluid admitting compartment including a support for holding the paper normally attached to said film so that it does not prevent the free development of said film when said carrier is supplied with a developing fluid.

31. In apparatus of the class specified, a box adapted to hold a plurality of flat films, a shaft therein and extending therethrough, a film holder associated with said shaft, and means for closing said holder about said shaft after a film has been transferred thereto by said shaft.

32. In a film pack developing apparatus, a box with a cover and means for holding a film pack with its flaps, an open film holder including a shaft in relation to said pack such that a flap thereof may be attached to said shaft, means external to said box for turning said shaft, and means for closing said film holder.

33. In an apparatus of the class set forth, a light tight box, a film pack holder therein, a film holder removably placed in said box, a shaft carried by said film holder, and means extending through said box for turning said shaft.

34. In an apparatus of the class set forth, a box having means for holding a supply of films, a two part telescoping film holder therein, and means extending through said box for transferring a film from said supply into said holder.

35. In apparatus of the character set forth, a container provided with a cover and closed to light, a film pack holder therein, a film holder near said pack holder and within said container, a shaft associated with said film holder and adapted to hold a film flap, and a crank exterior to said container for turning said shaft to pull a film by its flap from said film pack holder into said film holder to curl said film loosely about and spaced from said shaft.

In testimony whereof I have hereunto signed my name in the presence of the two subscribed witnesses.

PHILIP E. EDELMAN.

Witnesses:
STELLA S. EDELMAN,
ROSE EDELMAN.

Copies of this patent may be obtained for five cents each, by addressing the "Commissioner of Patents, Washington, D. C."